United States Patent

Riedhammer

[11] Patent Number: 5,996,435
[45] Date of Patent: Dec. 7, 1999

[54] ELECTRO-HYDRAULIC CONTROL DEVICE FOR POWER SHIFT GEARBOXES

[75] Inventor: Michael Riedhammer, Bermatingen, Germany

[73] Assignee: ZF Friedrichshafen AG, Friedrichshafen, Germany

[21] Appl. No.: 09/077,239

[22] PCT Filed: Dec. 5, 1996

[86] PCT No.: PCT/EP96/05425

§ 371 Date: May 22, 1998

§ 102(e) Date: May 22, 1998

[87] PCT Pub. No.: WO97/21944

PCT Pub. Date: Jun. 19, 1997

[30] Foreign Application Priority Data

Dec. 14, 1995 [DE] Germany .......................... 195 46 629

[51] Int. Cl.⁶ .................................................. F16H 61/26
[52] U.S. Cl. ........................ 74/336 R; 475/121; 477/130
[58] Field of Search ..................................... 477/127, 130, 477/906; 475/121, 122; 74/336 R, DIG. 1

[56] References Cited

U.S. PATENT DOCUMENTS

| | | | |
|---|---|---|---|
| 4,474,084 | 10/1984 | Sugano et al. ........................... | 477/128 |
| 4,903,551 | 2/1998 | Hiramatsu et al. . | |
| 4,936,430 | 6/1990 | Shikata ................................... | 192/3.58 |
| 5,505,673 | 4/1996 | Tsukamoto et al. .................... | 475/122 |
| 5,913,747 | 6/1999 | Minowa et al. ......................... | 477/127 |

FOREIGN PATENT DOCUMENTS 0 524 065 A1  1/1993  European Pat. Off. .

*Primary Examiner*—Sherry L. Estremsky
*Attorney, Agent, or Firm*—Davis and Bujold

[57] ABSTRACT

An electrohydraulic control device for power shift gearboxes, in particular in construction machinery, has switching elements (SE1, SE2, SE3) which can be actuated by a system pressure from an external pressurized medium source (1). Shift valves (SV1, SV2, SV3) are provided between the pressurized medium source (1) and the switching elements (SE1, SE2, SE3) and can each be actuated by pilot pressure. Each of the switching elements (SE1, SE2, SE3) can be actuated in a defined switching state by at least two actuated shift valves (SV1, SV2, SV3) and at least one non-actuated shift valve.

8 Claims, 1 Drawing Sheet

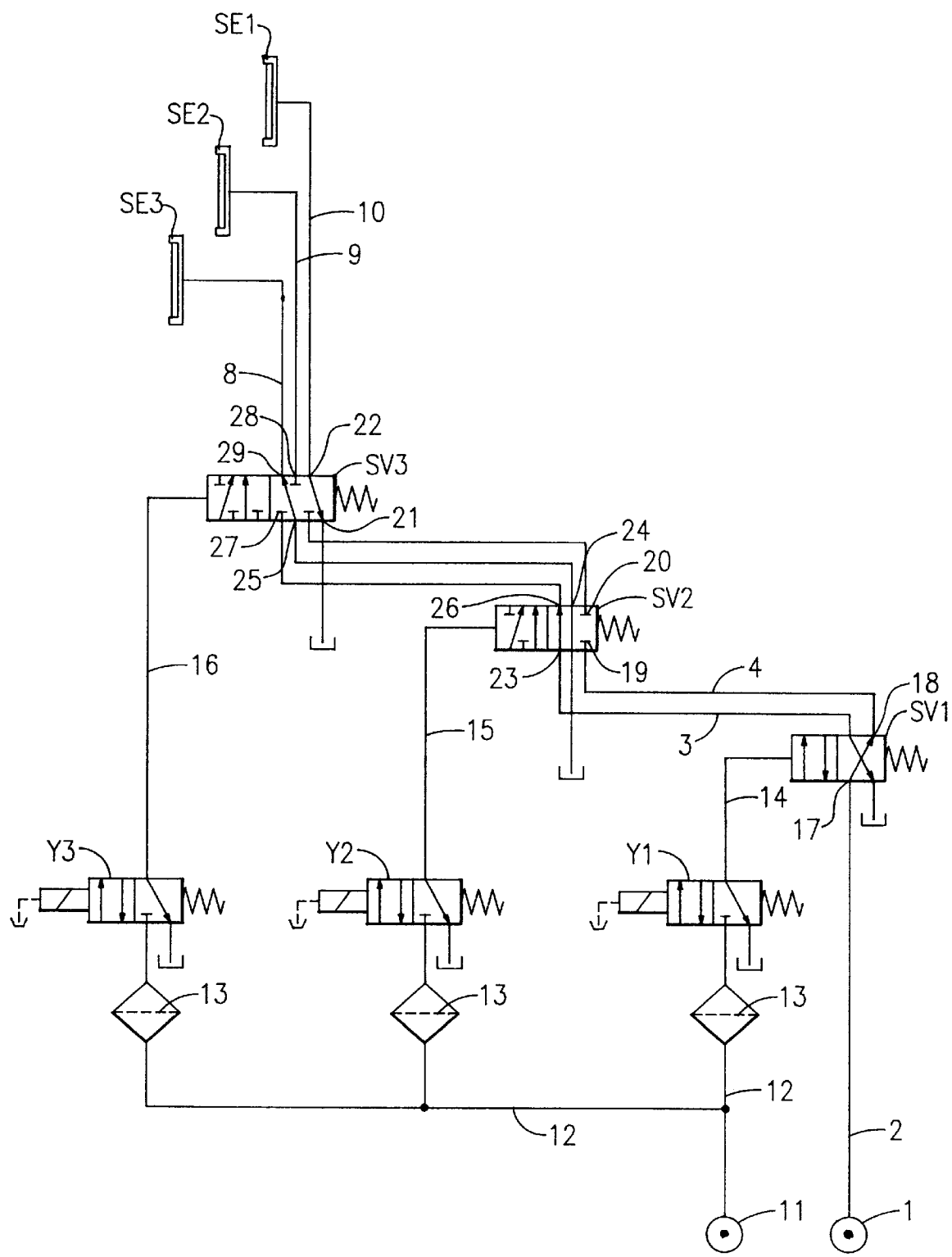

ELECTRO-HYDRAULIC CONTROL DEVICE FOR POWER SHIFT GEARBOXES

The invention relates to an electrohydraulic control device for power shift gearboxes, particularly in construction machinery.

BACKGROUND OF THE INVENTION

In construction machinery, such as excavator loaders, there are used in the practice power shift transmissions or group transmissions which as a rule are designed so as to have together with switching elements for selection of the driving direction, additional switching elements with which other reduction ratios, that is, different ranges of velocity or gears for a driving direction, can be adjusted. In order to make possible mounting of such a transmission as flexibly as possible in a construction machine or in a vehicle, in the practice the switching elements have been designed of remote control, that is with crank connections instead of a linkage.

For this purpose, the transmission controls for power shift transmissions known from the practice have electrohydraulic signal converters in which are used hydraulic mechanical components that have to be electrically controlled by a selector switch.

These known electrohydraulic signal converters have the advantage of being of reasonable cost, since as a rule an additional sensor system for their main operation can be omitted. Therefore, such control device is especially adequate for low-priced systems.

However, a considerable disadvantage of these transmission controls with electrohydraulic signal converters already known is that with the control devices, when a corresponding switching device such as a shift valve is activated, a coordinated switching element will always be actuated independently of whether the shift valve has been actuated by a driver or unintentionally due to an operation error, for example, a short circuit.

In the latter case, it can happen that gearshift elements already actuated are additionally engaged. Together with possible damage to the transmission, this can lead, depending on the driving state and road surface state, to instabilities in the behavior of the vehicle and to danger of an accident.

From the practice are also known transmission controls in which said disadvantages of the above described known controls, with electrohydraulic signal converters, are avoided by additionally disposing in said transmission controls a comprehensive sensor system with signal evaluation, by means of an electronic control equipment with integrated software.

However, those electronic systems as a rule required great expenditure and incur considerable costs.

SUMMARY OF THE INVENTION

This invention, therefore, is based on the problem of developing an electrohydraulic control device of the kind mentioned above in the sense that the transmission control with a constructionally simple design detects whether the actuation of a switching element has been intended.

According to the invention, this problem is solved by the fact that one of the switching elements can be actuated at a defined switching state by at least two actuated shift valves and at least one non-actuated shift valve.

Due to the fact that a certain number, namely, at least two or optionally more, of the shift valves have to be simultaneously actuated and a certain number, namely, at least one, of the shift valves must remain non-actuated in order to make actuating or switching of the element possible, the electrohydraulic control device according to the invention offers the special advantage that erroneous gearshifts or unintended actuations of switching elements can be to a greater extent eliminated, whereby damaging effects to the transmission caused thereby can be prevented or at least very much reduced.

Besides, by avoiding erroneous gearshifts, the operating safety while driving is definitely increased.

Another advantage of the control device of the invention is moreover that the structural design is especially simple and of reasonable cost, since only necessary valves and control elements are required.

Other advantages and advantageous designs of the invention result from the sub-claims and from the embodiment fundamentally described below with reference to the drawing.

BRIEF DESCRIPTION OF THE DRAWING

The drawing shows a basic representation of the electrohydraulic control device for a power shift transmission with three switching elements SE1, SE2 and SE3.

DESCRIPTION OF THE PREFERRED EMBODIMENT(S)

The electrohydraulic control device is designed with three shift valves SV1, SV2, SV3 which are serially disposed between the switching elements SE1, SE2, SE3 and an external pressurized medium source 1 which generates an impressed system pressure to actuate the switching elements SE1, SE2, SE3.

Depending on the position of the shift valves SV1, SV2, SV3, the system pressure can be passed, via a pressure line 2, from the external pressurized medium source 1 to the shift valve SV1, from this, via a pressure line 3 or another pressure line 4, to the shift valve SV2, from this, via one of three pressure lines 5, 6, 7, to the shift valve SV3 and finally from this, via a pressure line 8, to the switching element SE3 or via a pressure line 9, to the switching element SE2, or via a pressure line 10, to the switching element SE1.

The switching elements SV1, SV2, SV3 can be switched by means of a pilot pressure which is generated by another external pressure source 11. To this end, the pilot pressure is passed, via pressure lines 12 and a respectively intercalated feed-in filter 13, to control valves Y1, Y2, Y3 each of which is coordinated with one of the shift valves SV1, SV2, SV3 and connected therewith via a respective pressure line 14, 15, 16.

To actuate one of the shift valves SV1, SV2, SV3, the control valve Y1, Y2, or Y3 coordinated with the corresponding shift valve is controlled by electric pulses, the actuation of the control valves Y1, Y2, Y3, in turn, are by remote control, for example, by the driver of a construction machine giving his gear selection a control command, in the form of an electric pulse to the control valves Y1, Y2, Y3 by button pressure.

Herebelow is explained the operation of the electrohydraulic control device shown in the drawing.

The basic principle of the electrohydraulic control device consists in that each one of the switching elements SE1, SE2, SE3 can only be actuated in the presence of a defined switching state in which a certain number of shift valves SV1, SV2, SV3 is switched and a certain number thereof is non-actuated. To actuate one of the switching elements SE1, SE2, SE3, two shift valves must be precisely actuated and one shift valve remains non-actuated, that is the combination of the respectively actuated shift valves determine which of the switching elements SE1, SE2 or SE3 is switched. If only one shift valve, all three shift valves, or none of the shift valves is actuated, than a neutral position or idling speed position is adjusted.

In the switching state shown in the drawing, a hydraulic pressurized medium flows with the impressed system pressure from the external pressurized medium source 1, via the pressure line 2, to an input 17 of the shift valve SV1. The pressurized medium flows in the shift valve SV1 from the input 17 to an output 18 and flows on, via the pressure line 4, to the shift valve SV2 where it meets a closed input 19. The flow of pressurized medium terminates here in case the shift valve SV2 is not actuated via the control valve Y2.

If the shift valve SV2 is now actuated, a connection between the input 19 and an output 20 leading toward the pressure line 7 is freely switched in the shift valve, whereby the pressurized medium can flow through the shift valve SV2, via the pressure line 7, to the shift valve SV3. There again terminates the flow of pressurized medium and since it cannot flow on to any of the switching elements SE1, SE2, SE3, the transmission control switches to idling speed or neutral position, since only one shift valve, namely, the shift valve SV2, was actuated.

If simultaneously with the shift valve SV2 the shift valve SV3 is also switched, via the control valve Y3, there is created in the shift valve SV3 a connection between the input 21 and an output 22 for through-flow of the pressurized medium, which flows, via the pressure line 10, to the switching element SE1, which is thus actuated.

If as another variant, in addition to the switch valve SV2 and the shift valve SV3, the shift valve SV1 is also actuated by the control valve Y1, the pressurized medium is passed via the pressure line 3 to an input 23 of the shift valve SV2, through this to an output 24 and then, via the pressure line 6, to an input 25, then closed, of the shift valve SV3. The flow of the pressurized medium on to one of the switching elements SE1, SE2 or SE3 is thus no longer possible. In this case, when all three shift valves SV1, SV2, SV3 have been actuated, the transmission control adjusts again to a neutral or idling speed position.

If, on the other hand, in another switching the shift valve SV1 is actuated, whereby the pressurized medium is passed, via the pressure line 3, to the input 23 of the shift valve SV2 and the shift valve SV2 to an output 26 and then, via the pressure line 5, to a first closed input 27 of the shift valve SV3. If the driver of the vehicle now actuates by button pressure, the shift valve SV3 via the control valve Y3, together with the shift valve SV1, there is produced a pressure conveyance in the shift valve SV3 to an output 28 of the shift valve whereby the pressurized medium is passed via the pressure line 9 to the switching element SE2 which is thus actuated.

If as another variant the shift valves SV1 and SV2 are actuated, the pressurized medium is passed, via the shift valve SV1 and the pressure line 3, through the shift valve SV2 and the pressure line 6 to the shift valve SV3, which in the non-actuated state shown has a through connection from the input 25 to an output 29 from which the pressurized medium is passed, via the pressure line 8, to the switching element SE3 which is thus actuated.

As it results from the above description, the switching element SE1 can only be actuated when the shift valves SV2 and SV3 are actuated and the shift valve SV1 remains in the non-actuated state shown. To actuate the switching element SE2, the two shift valves SV1 and SV3 must be actuated precisely, and to actuate the switching element SE3, it is required precisely to switch the shift valves SV1 and SV2. If, on the contrary, only one, all three, or none of the shift valves SV1, SV2, SV3 is actuated the transmission falls in the idling speed position.

If one of the switched positions fails, the idling speed position will be adjusted in any case.

Since, to actuate one of the switching elements SE1, SE2, SE3, one single defined switching state with two actuated shift valves must be adjusted, unintended erroneous gearshifts and also unintended introduction of one gear out of the idling speed position can be prevented when actuating one shift valve.

By such a transmission control it is possible in addition to adjust one absolute idling speed state of the transmission.

Obviously, conceivable are also other embodiments not shown of such electrohydraulic control device which have more than three switching elements and more than three shift valves, the operation of the control device—mutatis mutandis—being the same as above explained with reference to the drawing. The basic idea of the invention is independent of the embodiment concretely described above and relates to a multiplicity of variants in which the combination of a specific number of switched and a specific number of unswitched shift valves constitutes a definite switching state for actuation of a switching element.

| Reference numerals | | | |
|---|---|---|---|
| 1 | pressurized medium source | 22 | output of the shift valve SV3 |
| 2 | pressure line | 23 | input of the shift valve SV2 |
| 3 | pressure line | | |
| 4 | pressure line | 24 | output of the shift valve SV2 |
| 5 | pressure line | | |
| 6 | pressure line | 25 | input of the shift valve SV3 |
| 7 | pressure line | | |
| 8 | pressure line | 26 | output of the shift valve SV2 |
| 9 | pressure line | | |
| 10 | pressure line | 27 | input of the shift valve SV3 |
| 11 | pressurized medium source | 28 | output of the shift valve SV3 |
| 12 | pressure line | | |
| 13 | feed-in filter | 29 | output of the shift valve SV3 |
| 14 | pressure line | | |
| 15 | pressure line | | |
| 16 | pressure line | SE1 | switching element |
| 17 | input of the shift valve SV1 | SE2 | switching element |
| | | SE3 | switching element |
| 18 | output of the shift valve SV1 | SV1 | shift valve |
| | | SV2 | shift valve |
| 19 | input of the shift valve 5V2 | SV3 | shift valve |
| | | Y1 | control valve |
| 20 | output of the shift valve SV2 | Y2 | control valve |
| | | Y3 | control |
| 21 | input of the shift valve SV3 | | |

I claim:

1. An electrohydraulic control device for powershift gearboxes having at least three switching elements (SE1, SE2, SE3) actuatable by a system pressure from an external pressurized medium source (1) wherein between said pressurized medium source and said switching elements are at least three shift valves (SV1, SV2, SV3) disposed, each of which is actuatable via a pilot pressure, wherein to actuate each one of said switching elements (SE1, SE2, SE3) at least two of said shift valves (SV1, SV2, SV3) must be simultaneously actuated while at least one of said shift valves (SV1 or SV2 or SV3) remains non-actuated.

2. The control device according to claim 1, wherein a neutral or idling speed position is defined by the simultaneous actuation of all three, or one, or none of said shift valves (SV1, SV2, SV3).

3. The control device according to claim 2, wherein a first of the switching elements (SE1) is actuated by actuation of a second and a third of the shift valves (SV2 and SV3), a second of the switching elements (SE2) is actuated by actuation of a first of the shift valves and said third shift valve (SV1 and SV3) and a third of the switching elements (SE3) is actuated by actuation of said first and second shift valves (SV1 and SV2).

4. The control device according to claim 2, wherein the pilot pressure for actuation of each of said at least three shift valves (SV1, SV2, SV3) is regulated by a respective control valve (Y1, Y2, Y3).

5. The control device according to claim 1, wherein a first of the switching elements (SE1) is actuated by actuation of a second and a third of the shift valves (SV2 and SV3), a second of the switching elements (SE2) is actuated by actuation of a first of the shift valves and said third shift valve (SV1 and SV3) and a third of the switching elements (SE3) is actuated by actuation of said first and second shift valves (SV1 and SV2).

6. The control device according to claim 5, wherein the pilot pressure for actuation of each of said at least three shift valves (SV1, SV2, SV3) is regulated by a respective control valve (Y1, Y2, Y3).

7. The control device according to claim 1, wherein the pilot pressure for actuation of each of said at least three shift valves (SV1, SV2, SV3) is regulated by a respective control valve (Y1, Y2, Y3).

8. The control device according to claim 7, wherein said control valves (Y1, Y2, Y3) are individually actuated by electric pulses.

* * * * *